United States Patent [19]

Damilano

[11] Patent Number: 5,788,188
[45] Date of Patent: Aug. 4, 1998

[54] CONTROL OF THE ATTITUDE OF A SATELLITE IN LOW ORBIT INVOLVING SOLAR ACQUISITION

[75] Inventor: Patrice Damilano, Toulouse, France

[73] Assignee: Matra Marconi Space France, Paris, France

[21] Appl. No.: 760,249

[22] Filed: Dec. 5, 1996

[30] Foreign Application Priority Data

Dec. 6, 1995 [FR] France ..................... 95 14418

[51] Int. Cl.⁶ ..................... B64G 1/28; B64G 1/32
[52] U.S. Cl. ..................... 244/165; 244/164; 244/166; 244/173; 701/13
[58] Field of Search ..................... 244/164, 165, 244/166, 171, 173; 701/13

[56] References Cited

U.S. PATENT DOCUMENTS

| | | | |
|---|---|---|---|
| 4,071,211 | 1/1978 | Muhlfelder et al. | 244/166 X |
| 4,084,773 | 4/1978 | Schmidt et al. | 244/166 |
| 5,123,617 | 6/1992 | Linder et al. | 244/166 |
| 5,248,118 | 9/1993 | Cohen et al. | 244/164 |
| 5,337,981 | 8/1994 | Bender | 244/164 |
| 5,653,407 | 8/1997 | Betheux et al. | 244/173 X |

FOREIGN PATENT DOCUMENTS 0544242  6/1993  European Pat. Off. .

*Primary Examiner*—William Grant
*Attorney, Agent, or Firm*—Gary M. Nath; Nath & Associates

[57] ABSTRACT

For controlling the attitude of the body of an earth satellite placed on a low orbit, values of components of the geomagnetic field of the earth are measured along three axes of a frame of reference bound to the body. The values are derivated with respect to time, and multiplied by a gain. Currents responsive to the multiplicated derivatives are passed through magnetic torquers located along the three axes of the body to create magnetic torques that bias the body to a fixed angular position relative to the field lines of the geomagnetic field. Such steps are continuously carried out during eclipse periods. Out of eclipse periods, the pitch of the body is controlled by modifying an internal momentum in response to a signal provided by a solar sensor, so as to maintain solar generators carried by the body of the satellite oriented towards the Sun.

7 Claims, 4 Drawing Sheets

SUN DIRECTION
S

S

CONTROL OF THE ATTITUDE OF A SATELLITE IN LOW ORBIT INVOLVING SOLAR ACQUISITION

The present invention relates to methods of controlling the attitude of a satellite placed in an orbit that is low enough for the intensity of the geomagnetic field of the earth to be sufficient to enable attitude to be measured by means of a three-axis magnetometer, and to enable attitude to be modified by causing magneto-couplers carried by the satellite to interact with the geomagnetic field.

In practice, this condition is satisfied so long as the altitude of the satellite over at least a portion of its orbit is less than 2,000 km.

A method of attitude control is already known for reducing the amount of spin of the satellite after it has been released from its launcher and for causing an axis associated with the satellite to be oriented normally to the plane of the orbit. In that method, use is made of a law known as the "B-dot" or $\dot{B}$ law to indicate that it makes use of the derivative of the geomagnetic field B. The geomagnetic field is measured on three axes of a frame of reference bound to the satellite, the measurements are differentiated with respect to time, the derivatives are multiplied by a gain, and currents representative of the results are passed through magneto-couplers (also known as magnetic torquers) to create magnetic torques that tend to keep the satellite in a fixed angular position relative to the field lines (isomagnetic lines) of the geomagnetic field.

That method is simple. It makes use only of sensors that are small and cheap, and of actuators that are normally employed on any satellite in low orbit, i.e. magneto-couplers, in addition to the reaction wheels or momentum wheels that are always provided in order to create angular momentum internally to the satellite. It avoids the use of propulsion thrusters that consume propellent and disturb the orbit, or of gyros which are not very reliable. It consumes energy proportionally to the speed of rotation of the satellite such that convergence is ensured under all circumstances and the satellite stabilizes.

However, the B-dot law ends up by causing the satellite to rotate at a rate that is equal to twice its orbital angular velocity (i.e. the satellite performs two revolutions per orbit) about an axis that is normal to the plane of the orbit, i.e. about the pitch axis. For some missions, such rotation constitutes a drawback. In particular it considerably reduces the average amount of sunlight received by the solar panels carried by the satellite if the panels are not steerable, and if the orbit has a small angle of inclination i relative to the equator or if the orbit is of medium inclination when the ascending node is close to noon or midnight local time.

SUMMARY OF THE INVENTION

It is an object of the invention to provide a method enabling the essential drawbacks of the B-dot law to be reduced by performing solar acquisition but without requiring use of gyros and/or of thrusters.

To this end, the invention provides a method in which B-dot control is maintained about the roll and yaw axes by means of a magneto-coupler acting along the pitch axis, and, apart from eclipse periods, an amount of pitch of the satellite is controlled by modifying its internal momentum in response to a signal provided by a solar sensor, so as to maintain solar generators carried by the satellite oriented towards the sun.

Although pitch control can be performed by means of magneto-couplers, it is advantageous to perform it by modifying the speed of momentum wheels around a reference value, while refraining to drive the magneto-couplers whose axes are along the roll and yaw directions.

As soon as the satellite is in the earth's shadow, i.e. starting from the beginning of each eclipse, the momentum wheels are returned to their reference or set speeds. Thus, the variation in the internal angular momentum is restored in the satellite from the beginning of the eclipse.

During eclipses, B-dot control is re-applied (i.e. drive commands are applied to all of the magneto-couplers) and the satellite begins again to rotate slowly about its pitch axis. The change in internal angular momentum acquired by the momentum wheels outside periods of eclipse is dissipated by the B-dot control. The momentum wheels are thus "unloaded". On coming out from an eclipse, pitch control is reactivated as soon as the sun comes into the field of view of the solar sensor fitted to the satellite. The angular momentum of the wheels is modified to absorb the pitch rotation that has taken place during the eclipse.

Thus, merely by adding a solar sensor which does not need to be of high accuracy it is possible to stop rotation of the satellite when that is desirable, e.g. to maintain the satellite in an orientation such that an axis associated with the satellite is oriented towards the sun, with that orientation being chosen so as to optimize the illumination of its solar panels.

Like the method using the B-dot law, the method of the invention requires neither thrusters nor gyros and the only sensors required are a three-axis magnetometer and a solar sensor. The solar sensor is chosen to have a large field of view so as to be able to see the sun as soon as the satellite comes out of eclipse. Only magneto-couplers and wheels are used to control attitude. The control relationships remain very simple. It is possible to use proportional control. Nevertheless, it will be more frequent to make use of a proportional-derivative type law.

The above features and others will appear more clearly on reading the following description of a particular embodiment, given by way of non-limiting example.

The description refers to the accompanying drawings.

DETAILED DESCRIPTION

Figure 1:
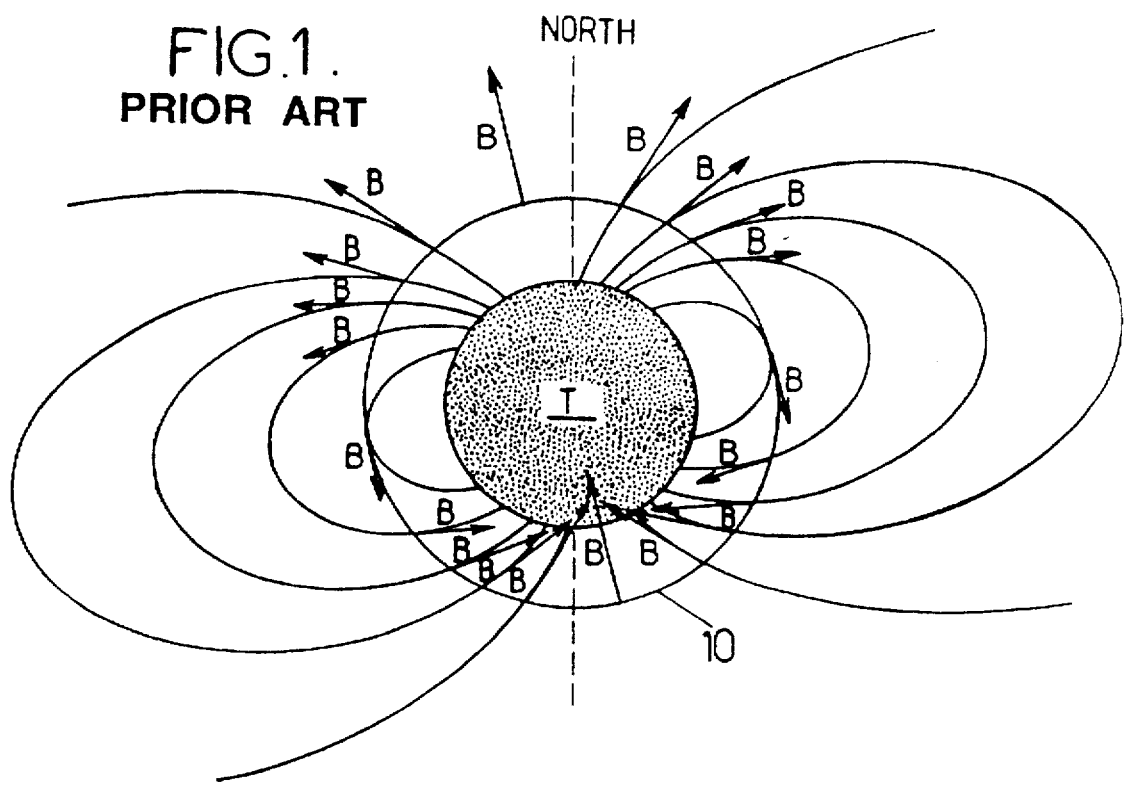
FIG. 1 is a diagram showing the configuration of the field lines of the geomagnetic field as crossed by a satellite on a polar orbit.

In a plane passing through the earth poles, the field lines of the geomagnetic field of the earth T have the general appearance as shown in FIG. 1. A satellite on a low polar orbit 10 crosses these field lines at a large angle except when close to the equator, thereby making it possible, given knowledge of the configuration of the magnetic field and of the position of the satellite on its orbit are known, to compute its attitude from measurements provided by a three axis magnetometer and to generate torques by means of magneto-couplers. In addition, use of the B-dot law makes it possible to consume or cancel the rotational energy of the satellite after separation from the launcher, or in the event of an incident, until the satellite is in a fixed orientation relative to the field lines of the geomagnetic field, thus causing the satellite to rotate at twice its orbital angular velocity $\omega_0$, about an axis normal to the plane of the orbit.

This rotation at twice the orbital angular frequency occurs about the axis of the satellite for which the internal angular momentum of the satellite is in alignment with the speed of rotation, i.e. perpendicular to the plane of the orbit. By an appropriate choice of rotation of speeds of the momentum wheels and/or reaction wheels conventionally provided on board a satellite, it is possible to select the direction of the satellite that remains oriented along the normal to the plane of the orbit, which can be done merely by using the three-axis magnetometer and the magneto-couplers. The momentum wheels are subsequently maintained at constant speed so that the orientation of the internal angular momentum remains on the pitch axis.

To avoid interactions between the magneto-couplers and the magnetometer, measurements are taken and the magneto-couplers are driven in alternation, for example. Since the B-dot law uses control based on the derivative of the magnetic field, the constant remanent magnetic moments of the satellite do not disturb measurement.

Figure 5:
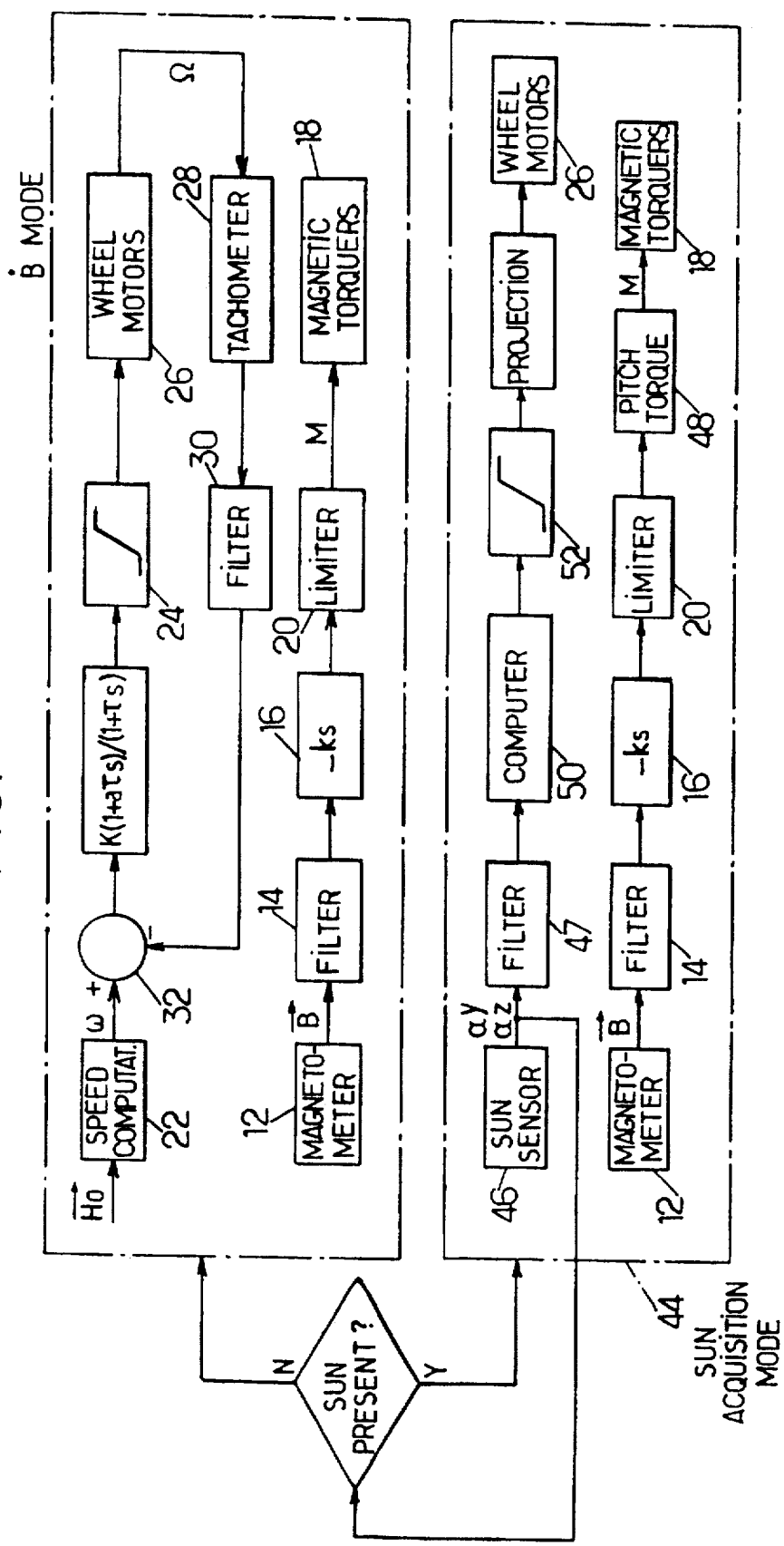
FIG. 5 is a block diagram of a circuit for implementing the modified B-dot law of the invention.

The top portion of FIG. 5 shows means that can be implemented for applying the B-dot law. These means comprise both a control system and a servo-control system for controlling the momentum wheels of the satellite so as to maintain the internal angular momentum of the satellite in a direction that is constant in a frame of reference tied to the satellite.

The control system includes a three-axis magnetometer 12 providing output signals which are filtered at 14 to eliminate interference and transients. A computation unit 16 determines the time derivative of the measurement and multiplies by gain k. To obtain equal damping time constants about the three axes, the gain k for each axis is advantageously standardized by the moment of inertia of the satellite about the relevant axis. The control torque applied by the magneto-couplers 18 is equal to the vector product of the magnetic moment $\vec{M}$ that they generate multiplied by the actual magnetic field $\vec{B}$. If the required torque corresponds to a current that is too high for the characteristic of the magneto-couplers to be linear, then an additional computation unit 20 takes saturation into account and limits current.

Before the control system operates, but after the satellite has been separated from its launcher, the motors of the wheels are powered so as to establish a set or reference angular momentum. Thereafter, the wheels are servo-controlled by a servo-control system which may be of the kind shown in the upper portion of FIG. 5. The reference angular momentum $H_0$ is applied to the input thereof and the angular velocities $\omega$ to be given to the wheels are computed at 22, taking account of the moments of inertia of said wheels. Servo-control is advantageously implemented by applying a proportional-derivative type law which can be written using the usual notation as follows:

$$K(1+\alpha\tau s)/(1+\tau s)$$

A limiter circuit 24 serves to limit acceleration of the wheels.

The output signal is applied to the motors of the wheels 26. Instantaneous speed is measured by a tachometer 28 whose output is applied via a filter 30 to a subtracter 32 located at the input of the circuit for generating the control signal, so as to maintain the speeds at the reference values.

The necessary computations can be performed either by hard-wired circuits, or by software, possibly by using an onboard computer of the satellite that also performs other functions.

The constraints implied by the B-dot law are described below for a satellite of the kind shown in FIG. 6 that has solar panels of fixed orientation with respect to the body of the satellite. The notation used is shown in FIG. 7:

$\omega_0$ designates orbital angular frequency;

i designates the inclination of the orbit relative to the equatorial plane;

$\omega_b$ designates the angular frequency with which the orbit precesses, which either drifts if the satellite is not helio-synchronous;

$\Omega_1$ designates the longitude of the ascending node NA of the orbit; and

X, Y, and Z respectively designate the roll, yaw, and pitch axes of the point of the orbit occupied at a given instant by the satellite.

Figure 6:
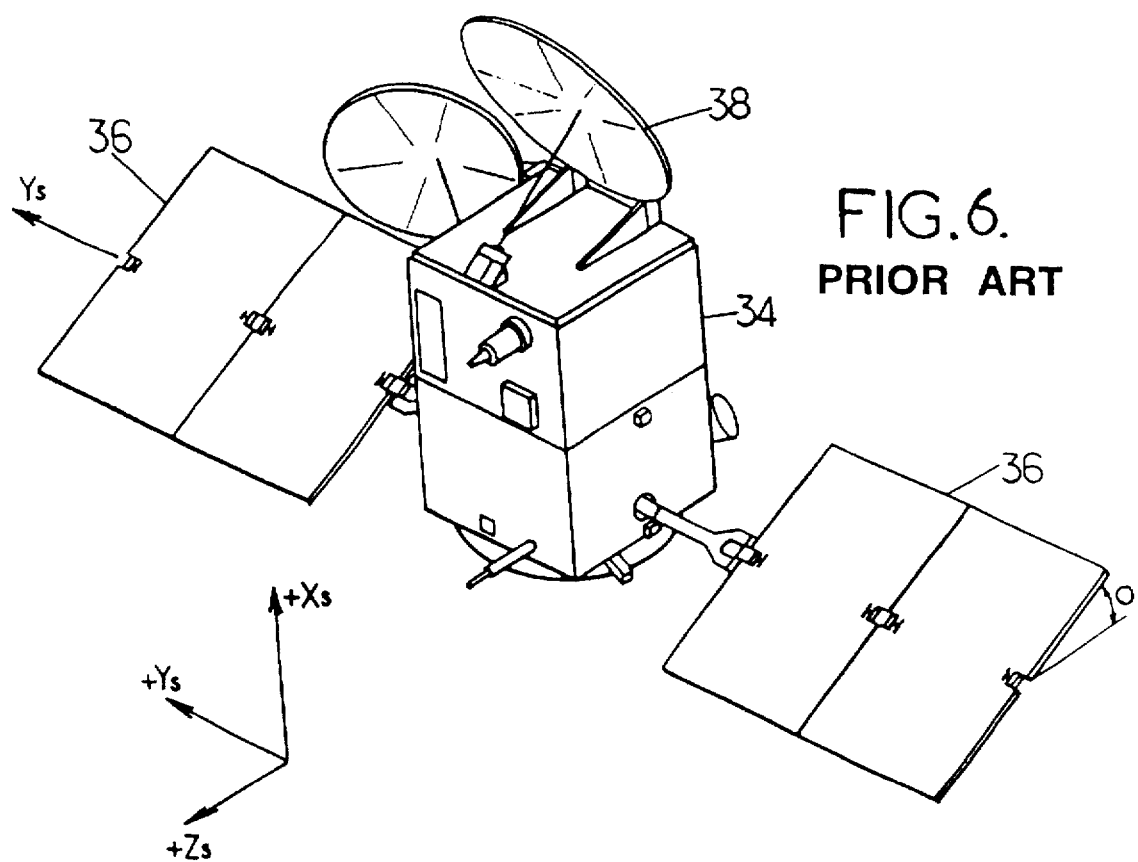
FIG. 6 shows one possible construction of a satellite to which the invention is applicable.
Figure 7:
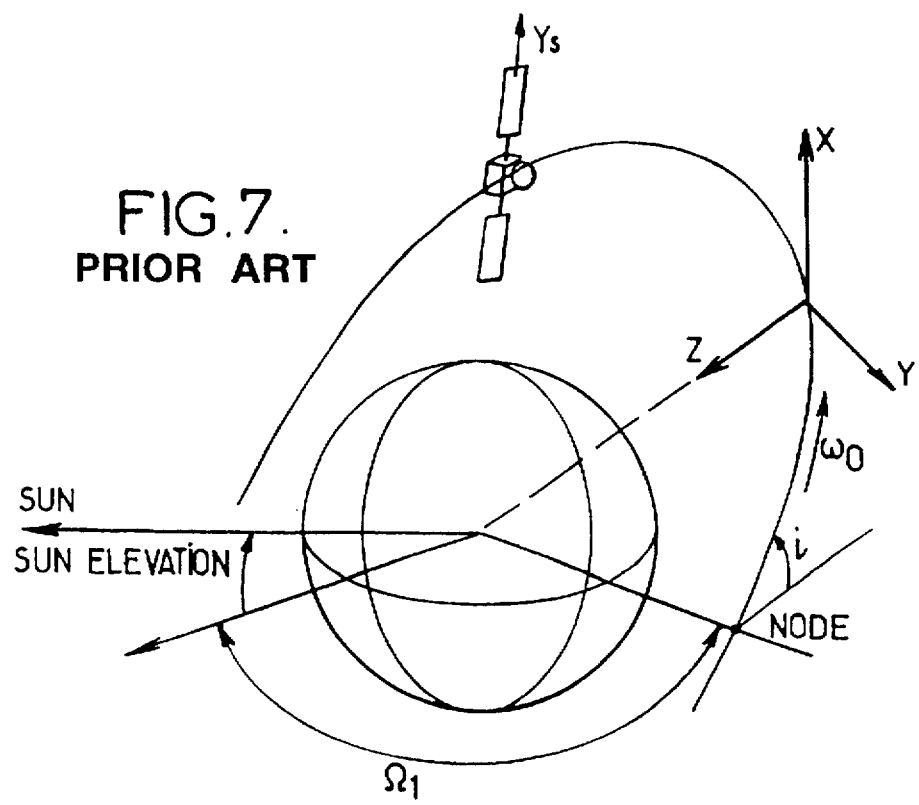
FIG. 7 is a diagram for showing the main parameters involved in controlling a satellite placed on a low orbit, inclined relative to the equator.

The satellite shown by way of example in FIG. 6 comprises a body 34 carrying antennas 38 and on which solar panels 36 are mounted in a fixed orientation. Conventionally, Ys designates the axis of the solar panels and Zs designates the axis of the satellite which, when the antennas 38 are in use, is oriented towards the earth.

As shown, the solar panels carry cells on their face looking in the -Xs direction. The angle of inclination of the panels relative to the YsZs plane is 30° in a case that can be considered as being typical for satellites used in inclined low orbits.

When the B-dot law is used, the average illumination of the solar panels on an orbit followed by the satellite depends on the inclination i of the orbit and on the longitude of the ascending node, which varies with the angular frequency $\omega_0$.

For an orbit that is close to a polar orbit (FIG. 2), the B-dot law is satisfactory with respect to solar panel illumination.

Figure 2:
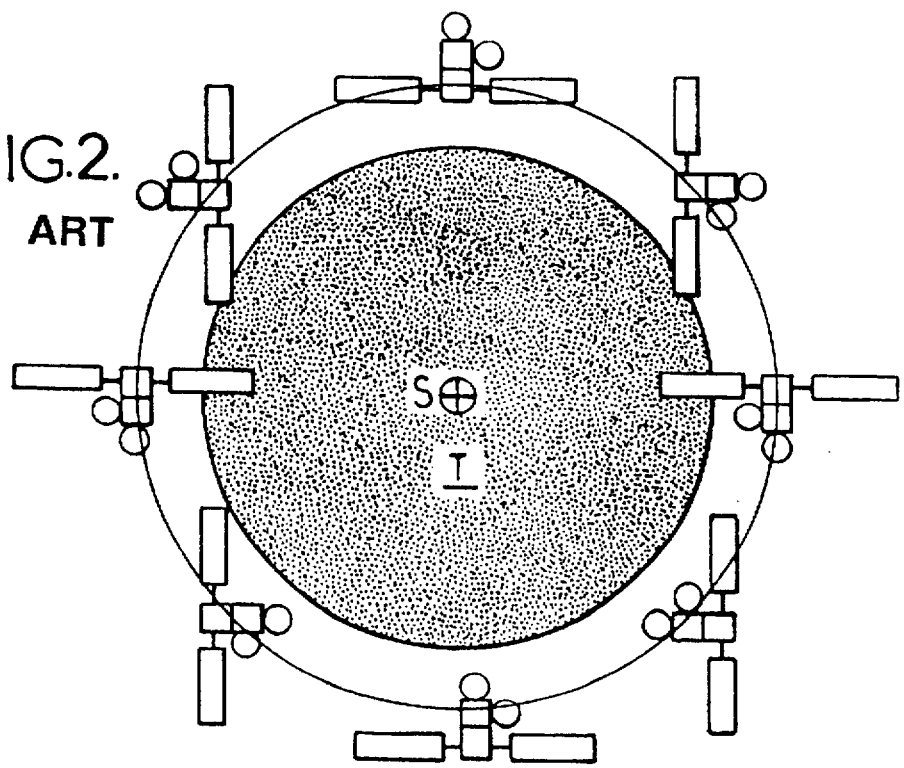
FIG. 2 shows successive orientations of a satellite in polar orbit or in an orbit that is highly inclined relative to the equator, when the ascending node is close to 6:00 AM or 6:00 PM, and with application of the B-dot law (the solar panels being in the "windmill" configuration, i.e. substantially in the plane of the orbit)

When the local time of the ascending node is close to 6:00 AM or 6:00 PM, the values given to the speeds of the wheels are such that the angular momentum is orthogonal to the face of the panels carrying the solar cells. Illumination is then at a maximum and substantially constant (FIG. 2).

On an orbit that is highly inclined and low, and that therefore drifts, the wheels are controlled to impart different orientations to the internal angular momentum depending on the local time or longitude of the ascending node.

Figure 3:
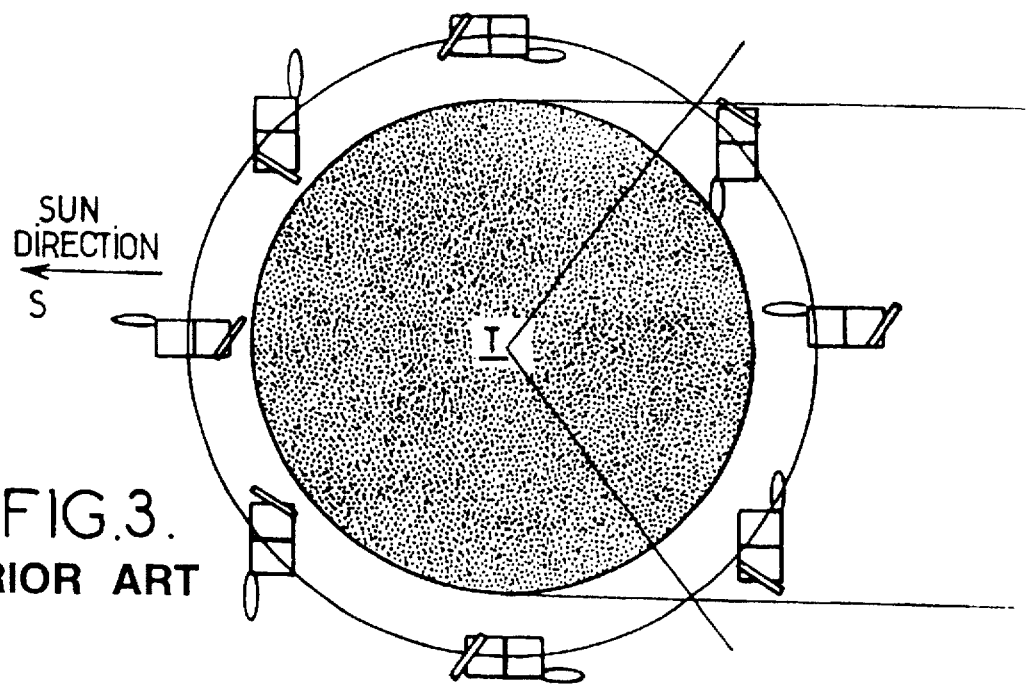
FIG. 3 shows successive orientations given by the B-dot law to a satellite placed on a highly inclined orbit and having its ascending node close to noon or midnight local time.

(a) If the ascending node is close to 6:00 AM, the direction of the angular momentum is placed opposite to a direction normal of the solar panels (which is the direction of the orbital angular velocity), (b) For a node close to 6:00 PM, the angular momentum is directed in the opposite direction, (c) For a node close to noon or midnight, the angular momentum is on the axis of the solar generators in either direction, since the satellite rotates about this axis at twice the angular frequency on the orbit (FIG. 3).

In practice, the orientation of the internal angular moment is changed in discrete manner at intervals of a few weeks.

It is observed that for orbits close to noon/midnight, rotation about the pitch axis at twice the orbital angular frequency reduces the effectiveness of the solar panels by a factor of about ⅔.

The invention makes it possible for this reduction to be made smaller by using a B-dot law but in association with solar acquisition in low orbits for which the nodes are close to noon and midnight.

There are thus three reference configurations: (a); (b); and (c) as modified by solar acquisition.

Figure 4:
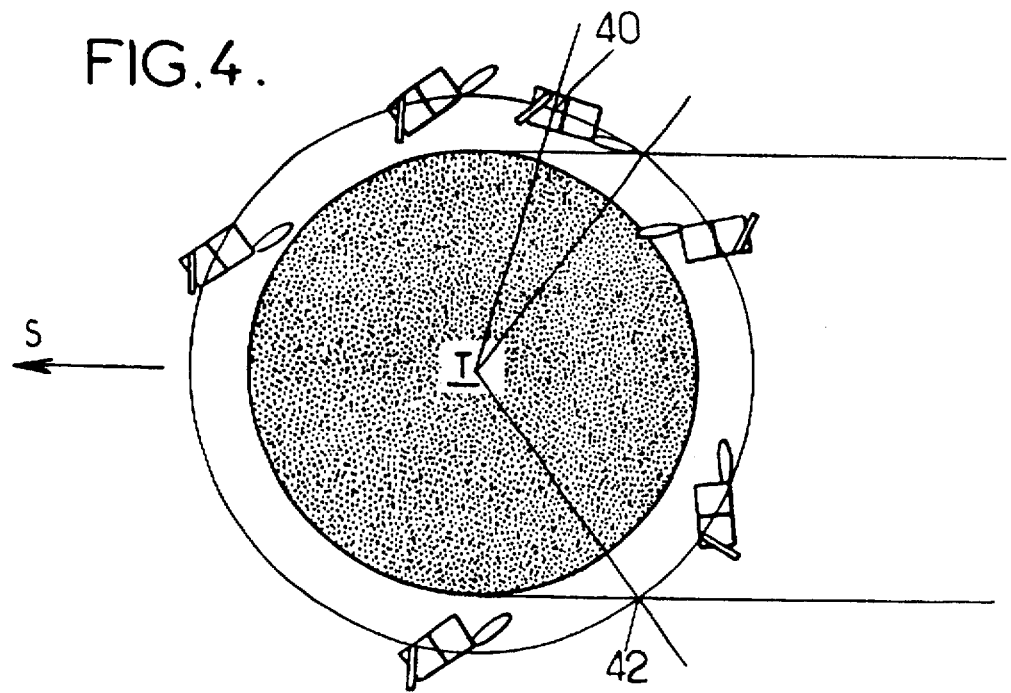
FIG. 4 is similar to FIG. 3 and shows successive attitudes taken by a satellite on an inclined orbit with an ascending node close to noon or to midnight local time, when the invention is implemented.

FIG. 4 is a diagram showing the successive attitudes taken up by a satellite of the kind shown in FIG. 6 for configuration (c).

1. The purpose of the first solar acquisition is to stop the rotation of the satellite about the pitch axis as induced by the B-dot law on noon/midnight orbits.

Pitch wheel control is merely added to B-dot law control, with control gain being optimized to ensure rapid convergence of acquisition.

Whatever the position of the satellite, rotation at twice the orbital angular frequency $\omega_0$ induced by the B-dot law guarantees that the solar sensor (not shown) will see the sun within its field of view within less than half an orbit. First acquisition of the sun can therefore always take place during the illuminated portion of the orbit.

2. When the satellite goes into eclipse (point 42), it is no longer possible to refer to sun. The signal provided by the solar sensor drops below a minimum. The satellite begins again to revolve at twice the orbital angular velocity.

On coming out of an eclipse of maximum duration, the satellite will have revolved through about 200°, so the sun is already in the field of view of the sensor. Solar acquisition is fast since the pitch angular velocity $2\omega_0$ is very slow.

Since solar acquisition control is by way of a pitching torque, obtained by a loop applying a proportional-derivative law to the filtered measurement from the sensor and implemented by means of the wheels, acquisition is fast and reliable even on orbits at small inclination.

3. On coming out of an eclipse, the solar sensor having a wide field of view, which may be coarse, acquires the sun as from position 40 on the orbit. Pitch rotation is stopped and the angular momentum corresponding to the angular velocity of the pitching body is stored by the wheels. While aiming at the sun, only the pitch magneto-coupler is still driven, and that does not cause any angular momentum to be accumulated by the wheels.

4. On going back into eclipse, the wheels are returned to their reference angular momentum and all of the magneto-couplers are again driven in accordance with the B-dot law, thereby causing the satellite to resume pitching rotation at twice the orbital angular frequency.

When no measurement is available, the solar presence signal from the sensor serves to deliver a zero reference signal to the magneto-couplers without changing mode: solar acquisition mode may be authorized once the following criterion has been satisfied: B smaller than a predetermined minimum for a determined length of time $\Delta t$. For a satellite on an orbit having a large angle of inclination, e.g. 67°, and an altitude of 1,300 km, a minimum that can be adopted is $3.10^{-4}$ rad/s with $\Delta t = 15$ min.

The means for implementing the method can be those shown diagrammatically in FIG. 5. Switching between B-dot mode and solar acquisition mode 44 is performed by testing for the presence of a significant signal from the solar sensor 46.

In solar acquisition mode, control of the magneto-couplers is modified only by suppressing drive of the magneto-couplers having axes directed along roll axis Xs and yaw axis Zs to produce a pitching torque (block 48). The magneto-coupler along Ys continues to control roll and yaw.

A control signal proportional to the aspect angle of the sun as seen by the solar sensor 46 is applied to the wheels. The detected solar aspect angles are $\alpha y$ (rotation about the axis Zs) and $\alpha z$ (rotation about the axis Ys). The torque is proportional to the measured value of az and in a direction tending to cancel said magnitude. Orders are generated by computer means 50 after filtering at 47 so as to issue a torque as follows:

$$(1) C = -k_{sol}(1+\alpha\tau p)\alpha z/(1+\tau p)$$

where $k_{sol}$ designates gain.

Equation (1) makes use of first order phase lead that can sometimes be omitted.

The wheel motors are controlled, via peak limiters to limit speeds of change and so as to cancel pitching rotation. For this purpose, the wheels must compensate the angular momentum of the satellite in pitching at the beginning of acquisition, i.e.:

$$H_y = I_y(2w_0)$$

where $I_y$ is the inertia about Ys.

On the illuminated portion of the orbit, the angular momentums of the wheels drift since the torques are constant in pitch in an inertial frame of reference. It turns out that in the worst case, drift is comparable to the unloading capability for ordinary wheels.

On entering into an eclipse, i.e. when the solar sensor loses the sun, the wheels are returned to their reference angular momentums. The satellite absorbs the change in angular momentum and it rotates again. During the eclipse, the B-dot law returns pitch rotation to a speed of about twice the orbital angular velocity, thereby dissipating the angular momentum drift accumulated in the wheels during the illuminated portion of the orbit. The wheels are unloaded by the magneto-couplers.

I claim:

1. A method of controlling an attitude of a body of an earth satellite placed on a low orbit, comprising the steps of:
   (a) measuring values of components of the geomagnetic field of the earth, along three axes of a frame of reference bound to said body of the satellite,
   (b) derivating said values with respect to time,
   (c) multiplying the so obtained derivatives by a gain,
   (d) passing currents responsive to the multiplicated derivatives through magnetic torquers located along said three axes of said body to create magnetic torques that bias said body of the satellite to a fixed angular position relative to field lines of said geomagnetic field, said steps (a) to (d) being continuously carried out during eclipse periods, and
   (e) out of said eclipse periods, controlling an amount of pitch of said body of the satellite by modifying an internal momentum thereof in response to a signal provided by a solar sensor carried by said body, so as to maintain solar generators carried by said body of the satellite oriented towards the Sun.

2. A method according to claim 1, wherein, during step (e), said amount of pitch is controlled by modifying speeds of wheels carried by said body around a reference value, while suppressing drive of those of said magnetic torquers whose axes are along roll and yaw directions of said body.

3. A method according to claim 2, wherein said step (e) is only carried out for non polar orbits inclined on the equator of earth and only for those of said orbits which have nodes close to noon and midnight earth local time.

4. Method according to claim 3, wherein said step (e) is only carried out after said derivative of said values has been reduced below a predetermined threshold by an action of said magnetic torquers.

5. Method according to claim 2, further comprising the step of bringing back said wheels to a predetermined set speed at the beginning of each of said eclipse periods to restore a variation in the internal angular momentum to said satellite.

6. Method according to claim 5 comprising the steps of resuming drive commands of all said magnetic torquers for causing the body of the satellite to rotate slowly about a pitch axis thereof, causing any change in internal angular momentum acquired by said wheels outside periods of eclipse to be consumed by B-dot control and causing unloading of said wheels.

7. Method according to claim 2, wherein said wheels are momentum wheels.

\* \* \* \* \*